June 19, 1923.

J. SCHURCH

ELECTRIC DRIVE FOR VEHICLES

Original Filed Jan. 4, 1921

Inventor
Jacob Schurch
by Graham + Harris
Attorneys

Patented June 19, 1923.

1,459,165

UNITED STATES PATENT OFFICE.

JACOB SCHURCH, OF LOS ANGELES, CALIFORNIA, ASSIGNOR OF ONE-HALF TO WILLIAM H. HEISE, OF LOS ANGELES, CALIFORNIA.

ELECTRIC DRIVE FOR VEHICLES.

Application filed January 4, 1921, Serial No. 435,040. Renewed March 3, 1923.

*To all whom it may concern:*

Be it known that I, JACOB SCHURCH, a citizen of Switzerland, residing at Los Angeles, county of Los Angeles, and State of California, have invented a new and useful Electric Drive for Vehicles, of which the following is a specification.

*Objects.*

My invention relates to self propelled vehicles such as automobiles, tractors, trucks etc. and particularly to vehicles which are propelled by internal combustion engines. While the high thermal efficiency of the internal combustion engine makes such an engine an economical prime mover for use on such vehicles, it is a well understood fact that it is not inherently well suited for driving vehicles. This is due to the fact that internal combustion engines are most efficient when driven fully loaded at a constant speed and that at low speeds and low loads, such engines show a very great loss in efficiency and power. In fact, at low speeds, the engine delivers so little power as to be readily stalled. To overcome these inherently bad features of the internal combustion engine in the conventional form of motor driven vehicle a clutch is provided so that the engine can be started without load and a geared transmission is provided so that the engine can be coupled to the load at several different gear ratios. When applied to an automobile or truck and usually when applied to a tractor, it is also common practice to provide a geared rear axle which contains a differential including several bevel gears. The standard construction of an automobile thus includes a clutch, a transmission and a differential. All such mechanical devices are a source of mechanical loss, high first cost and high maintenance expense. They also are a source of trouble as wear or breakage is frequent.

It is an object of my invention to provide a vehicle which is driven by a standard internal combustion engine and in which there is neither a transmission, a clutch or a differential.

In the standard form of automobile, some skill is required to manipulate the clutch and transmission gears and few drivers ever learn to operate them as they should be operated to insure long life and high economy. It is true that the present automobile will run even when operated unskillfully but when so operated, it quickly wears out and it uses up excessive quantities of fuel.

A further object of my invention is to provide an automobile in which the clutch and transmission gears are absent and in which the operations of starting and running are greatly simplified.

Owing to the inherently inappropriate characteristics of the standard internal combustion engine, in the standard form of automobiles it is run a considerable part of the time at low efficiencies, and it is a further object of my invention to provide structure such that the engine can at all times be run at a high efficiency.

A further object is to provide a series direct current generator which is driven directly by an internal combustion engine and which in turn drives series motors which are connected to the rear wheels.

Due to the peculiar characteristics of the series direct current generator and the series direct current motor, the combination of such a generator with an internal combustion engine for driving a vehicle by means of direct current series motors produces certain new and useful results to be more fully described hereinafter.

A further object is to provide a series direct current generator having a commutator on either end in combination with two motors and means for connecting the windings of said generator and motors in different relationship so that the speed and torque ratios between the internal combustion engine and the wheels can be varied electrically without the interposition of clutches, gears, or other mechanical devices.

Further objects and advantages will be set forth more in detail hereinafter.

Referring to the drawings which are for illustrative purposes only,

Figure 1:
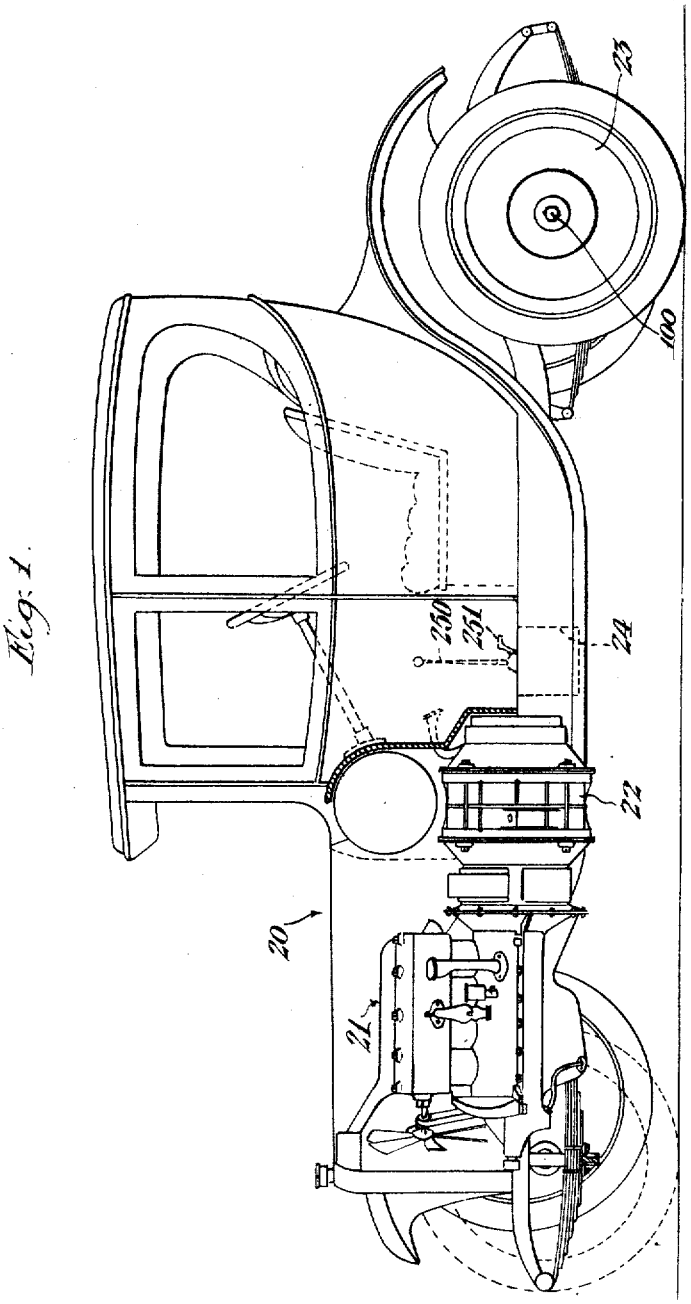
Fig. 1 is a side elevation of the engine and generator, an automobile outline considered as partially transparent being impressed thereon to show the general location of the parts.

General features.

My invention is shown applied to an automobile 20 which carries an internal combustion engine 21. The engine 21 drives a series direct current generator 22 and this generator in turn drives two series direct current motors 23 which are incorporated in the rear wheels of the automobile, and which may be connected either in series or parallel with each other by a controller 24. A storage battery 25 is provided for starting, lighting and ignition and also to maintain a small initial excitation on the generator 22.

The engine may be provided with a standard motor, not shown, operated by the battery 25 and the battery may be charged by a standard charging generator, not shown.

The engine 21 is of any standard form, being either four or two stroke cycle and operating either on low compression like the present standard automobile engines or on high compression like the Diesel engine. It is coupled direct to the generator 22.

Diagram.

Figure 2:
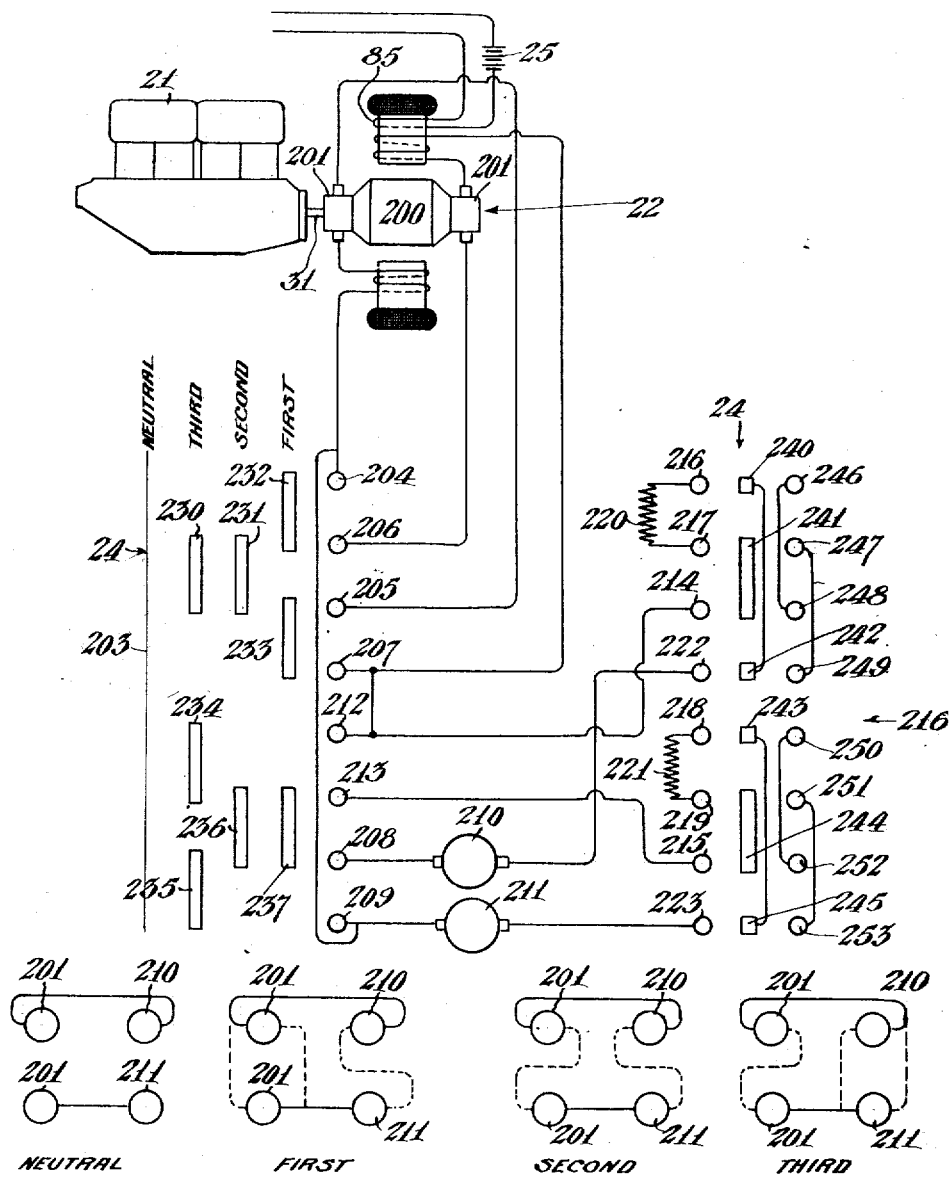
Fig. 2 is a schematic diagram of connections.

The method of connection is shown very diagrammatically in Fig. 2. In this figure a double commutator generator 22 is shown mechanically connected to and driven by an internal combustion engine 21. A portion of the field of the generator 22 is shown excited by the battery 25. The armature 200 has two commutators 201, each commutator exciting a portion of the field of the generator 22. The two commutators are so connected into the main portion 203 of the controller 24 that one armature is connected to the fingers 204 and 205 and the other to the fingers 206 and 207. One terminal of each of the motor armatures 210 and 211 is connected to the fingers 208 and 209. Fingers 212 and 213 are connected to fingers 214 and 215 on the reverser portion 216 of the controller 24. The field 220 of one motor is connected to the fingers 216 and 217 and the field 221 of the other motor is connected to the fingers 218 and 219. One wire from the armature 210 is connected to a finger 222 and one wire from the armature 211 is connected to a finger 223. The main portion of the controller 24 has a drum including conducting segments 230 to 237 inclusive and the reverser portion 216 of the controller 24 has conducting segments 240 to 253 inclusive a development of each drum being shown in Fig. 2. The main drum of the controller is provided with blank spaces along the line marked neutral so that all the fingers 204, etc., pressing on said drum are disconnected with the drum in the neutral position. The fingers 207 and 212 and the fingers 204 and 209 are permanently connected together.

First position.

With the fingers 204, etc., resting on the segments 232, 233 and 237 the controller 24 may be said to be in the first position and the connections may be said to be those of the first position i. e. the generators in multiple and the motors in series. The fingers 204 and 206 are connected together by the segment 232 and with finger 209. Current generated in each generator winding passes through the field windings being delivered to the fingers 205 and 207 which are connected together by the segment 233. This current is delivered to the finger 214 of the reverser flowing through the segment 241 to the finger 217 through the field 220 to the finger 216, to the segment 240 which is connected to the segment 242. From the segment 242, current flows to the finger 222 and to the armature 210, thence to the finger 208 and across the segment 237 to the fingers 213 and 215. From 215, the current flows through the segment 244 to the finger 219 through the field 221 to the finger 218 and thence through segments 243 and 245 to the finger 223 through the armature 211 to the finger 209 which is connected to the fingers 204 and 205. The generators are thus in parallel and the motors are in series. The relative polarity of the fields and armatures of the motors can be changed by moving the reverser drum so that the fingers 216, etc. rest on segments 246 to 253.

Second position.

In the second position, the motor connections remain unchanged, the segment 236 being exactly like segment 237. The generators are, however, put in series, current flowing from the finger 204 through one generator to the finger 205 across the segment 231 to the finger 206 through the other generator winding to the finger 207 which is connected to the finger 212 through which the motors are fed.

Third position.

In the third position, the generator windings are left in parallel, the segments 230 and 231 being identical. The motors are, however, connected in parallel. The fingers 212 and 213 are connected together by the segment 234 which in effect connects the fingers 214 and 215 together and throws the fields 220 and 221 in parallel with each other, each being in series with its own armature 210 or 211, the fingers 208 and 209 being connected together by the segment 235.

*Controller.*

The controller 24 may be located beneath the floor of the automobile the main drum, carrying the segments 230 to 237, being operated by a handle 250 and the reverser drum carrying the segments 240 to 243 being operated by a pedal 251 as shown in Fig. 1.

Figure 3:
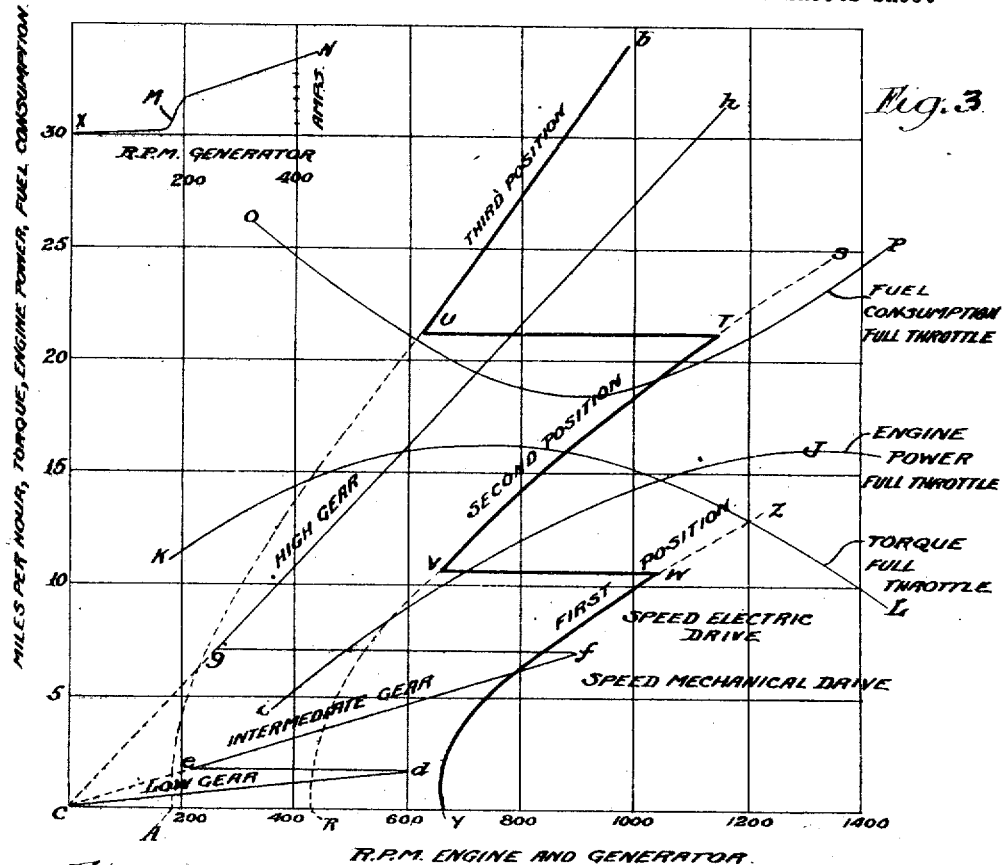
Fig. 3 is a chart showing performance of the various apparatus.

The characteristics of a series generator are illustrated graphically in the small diagram in the upper left hand corner of Fig. 3 in which the revolutions per minute of the generator are read from the point X to the right and in which the amperage is read from the point x vertically. This represents the behavior of a series generator connected to a constant resistance, this is to say, it represents the performance of the generator 22 previous to the time that the automobile 20 is started as previous to this time the motors being stationary are without effect other than that due to their resistance. Due to the constant field produced by the windings 85, the amperage increases very slowly in proportion to the speed until the point M is reached at which time the current delivered is negligible. As the speed increases, the generator builds up very rapidly until the magnetic field becomes saturated and then the current increases along the line N. This characteristic of a series generator is very valuable when applied to an internal combustion engine as it is possible to run the engine at 175 revolutions per minute directly connected to the motors without the generator developing sufficient current to impose more than a very small load on the engine. As soon as the generator starts to build up, or as soon as the point M is reached, the load increases quite rapidly.

In the chart, Fig. 3, I show the performance which may be expected with my invention. When starting on a level road, the engine is allowed to speed up to the point A, that is to say, to a point just below 200 R. P. M. When the generator reaches a speed of 200 R. P. M. it will develop sufficient current to start the automobile on the level on a fair road bed with the motors in the third position, i. e. with the generators in series and the motors in parallel, the car thereafter being accelerated along the line A—B so that, for example, when the generator runs at 800 R. P. M. the automobile has a speed of about 28 miles per hour. This is the normal method of starting on good roads and where excessive traction is not required. It should be contrasted with the method of starting with a mechanical gear of which is now standard in automobile practice. With a mechanical gear, the engine is first started and when it has attained some speed, the clutch is thrown in and the car is thereafter accelerated along the line C—D until the engine is running about 600 R. P. M., and the automobile is traveling at the speed of about two miles per hour. The clutch is then disengaged, the speed of the engine is then dropped and the automobile is put into intermediate gear accelerating from E to F or up to a speed of about 900 R. P. M. for the engine. This speed corresponds to a speed of about seven miles per hour for the automobile. The clutch is again disengaged and the speed of the engine is again reduced, the automobile being thrown into high gear accelerating along the line G—H.

In Fig. 3, I show the curve I—J representing the horse power of a typical automobile engine at different speeds with the throttle wide open, the curve K—L indicating the torque developed by the engine at various speeds with the throttle wide open and the curve O—P which indicates the fuel consumption in gallons per mile with the throttle fully open.

Figure 4:
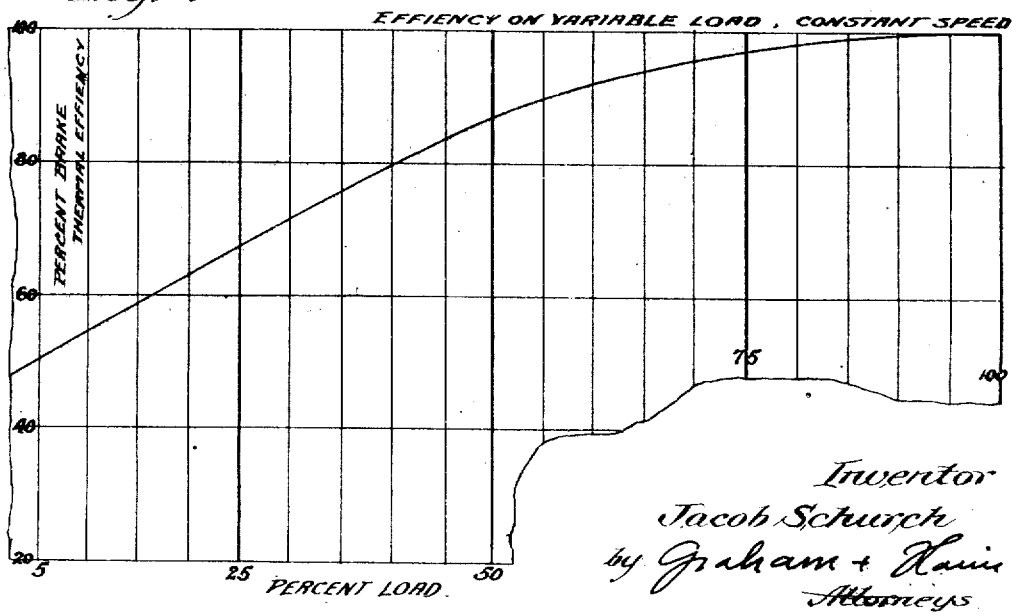
Fig. 4 is a chart showing performance of internal combustion engine partly loaded.

In Fig. 4 I show a curve which shows the efficiency of an internal combustion engine running at any speed with a variable load, i. e. with the throttle closed a variable amount.

Referring to the diagram in Fig. 3, it will be seen that the greatest efficiency is obtained at about 900 R. P. M. for the particular engine considered and that the greatest torque is obtained at about 700 R. P. M. In starting the engine mechanically along the line C—D, E—F, G—H, it is ordinarily necessary to start with the throttle only partly open say 25% of the full load on the engine being used.

Referring to the curve of Fig. 4, it will be seen at this speed the efficiency is only about one-half of what it would be if the throttle were fully open.

Referring to the curves of engine performance, it will be noted that at low speeds very little power or torque is developed. It is, therefore, evident that in starting an internal combustion engine mechanically in the standard manner with low and intermediate gear, we have very little power and torque at low speeds of the engine, and we have very little efficiency at high speeds. By starting the engine along the curve A—B, we are able to open up the throttle at 200 R. P. M. and to accelerate smoothly with the wide open throttle and with a high efficiency. The torque at this speed is considerable.

If it is necessary to start or run the engine on grades or it is necessary to pull out of sand or under bad road conditions, it is possible to use my invention with the motors in their second position or with both motors and both generators in series. In so doing, the speed relation is shown by the curve R. S.

In practice as soon as the engine reaches the speed of about 1150 R. P. M. on the curve R. S. indicated by the point T, it is advisable to drop the speed to about 620 R. P. M. or to the point U and to then connect the motors in their third position allowing the acceleration to take place thereafter along the line U—B or in third position. In case of very adverse condition, it may even be desirable to connect the motors into the first position for starting, i. e. with the generators in multiple and the motors in series. The acceleration may then take place along the line Y—Z.

In practice as soon as the engine is accelerated to the point W on the curve Y—Z, the speed is reduced to the point V, connection being then made in the second position and the engine, therefore, accelerating along the lines V—T, U—B and change to the third position being made whenever the engine reaches the speed T. For very heavy starting, it is therefore evident that the engine may be accelerated along the lines Y—W, V—T, U—B. When so accelerated, it is evident that the speed of the engine never falls below 600 R. P. M. and never exceeds 1200 R. P. M.

Referring to the fuel consumption, curve O—P, it will be seen that this range from 600 to 1200 R. P. M. represents the range of greatest efficiency of the engine and referring to the curve K—L, it will be noted that the engine develops its greatest torque at about 800 R. P. M. so that by accelerating along the line Y—Z, V—T, U—B, we are at all times operating the engine at its greatest efficiency and at very nearly maximum torque. By so operating the engine, it is possible to reduce the size of engine ordinarily applied to automobiles and it is further possible to reduce the size of generators and motors employed so that the weight necessary in my form of invention is not excessive.

I have found that the characteristics of a series generator and series motors are so well suited to the characteristics of an internal combustion engine that by proper proportioning of the generators and motors, it is unnecessary to manipulate the controller except under abnormal conditions, the controller being normally left in the third position and the automobile started and stopped by manipulating the engine throttle only. In practice, therefore, the first and second positions are merely emergency connections used to pull up heavy grades or out of deep mud or sand. In some cases I dispense entirely with the first position using the second position to pull out of mud, etc., and the third position for running.

I claim as my invention:

1. In a vehicle, the combination of: an internal combustion engine; a series direct current generator driven by said engine and having a single field and an armature having two windings; means for connecting said armature windings in series or in parallel; two series direct current motors, one driving one of the wheels of said vehicle and the other driving another wheel of said vehicle; means for connecting said motors in either series or parallel; and means for connecting said generator to said motors.

2. In a vehicle, the combination of: an internal combustion engine; a series direct current generator driven by said engine and having a single field and an armature having two windings; means for connecting said armature windings in series or in parallel; two series direct current motors; means for connecting said motors in either series or parallel; and means for connecting said generator to said motors.

3. In a vehicle, the combination of: an internal combustion engine; a series direct current generator driven by said engine and having a single field and an armature having two windings; means for connecting said armature windings in series or in parallel; series direct current motors driving said vehicle; and means for connecting said generator to said motors.

4. In a vehicle, the combination of: an internal combustion engine; a series direct current generator driven by said engine and having a single field and an armature having two windings; means for connecting said armature windings in series or in parallel; series direct current motors driving said vehicle; and means for connecting said generator to said motors.

In testimony whereof, I have hereunto set my hand at Los Angeles, California, this 29th day of December 1920.

JACOB SCHURCH.